July 5, 1966                S. BOONE ETAL                3,258,826
           METHOD OF PRODUCING A SOLID ELECTROLYTIC CAPACITOR
                   HAVING A SEMI-CONDUCTIVE ELECTROLYTE
Filed Jan. 3, 1962                                    2 Sheets-Sheet 1

INVENTOR
SALOMON BOONE
HENDRIK VOETEN
BY
AGENT

United States Patent Office 3,258,826
Patented July 5, 1966

3,258,826
METHOD OF PRODUCING A SOLID ELECTROLYTIC CAPACITOR HAVING A SEMI-CONDUCTIVE ELECTROLYTE
Salomon Boone and Hendrik Voeten, both of Centuurbaan, Zwolle, Netherlands, assignors to North American Philips Company, Inc., New York, N.Y., a corporation of Delaware
Filed Jan. 3, 1962, Ser. No. 164,034
Claims priority, application Netherlands, Jan. 9, 1961, 259,874
7 Claims. (Cl. 29—25.31)

This invention relates to solid electrolytic capacitors having an aluminum anode and an electrolyte in the form of a solid semi-conductive substance and to a method of making the same.

A method is known for manufacturing a solid electrolytic capacitor, in which an anode body of valve metal is provided by anodic oxidation with a dielectric oxide layer (formation). The resultant anode body is wetted with a solution or a suspension of a salt of an oxygen-containing acid, this salt being converted by pyrolysis into the semi-conductive oxide. The wetted anode body is subsequently heated, and the formation, the wetting and the pyrolysis are repeated at least once, after which the anode body is again subjected to formation and finally the body is covered by a layer of conductive material and an envelope and provided with supply wires. In this known method it is advisable to dry slowly the anode body wetted with the solution or the suspension and to heat it subsequently at about 400° C.

The solid electrolytic capacitor has considerable advantages over the formerly generally employed capacitor having a liquid electrolyte. With these solid capacitors there is no risk of desiccation owing to the consumption of liquid by electrolysis or owing to inadequate seal, and the capacity and the loss angle are less dependent upon the temperature and upon the frequency, whilst these capacitors may be used at lower temperatures, for example of —80° C.

The metal ion of the salt which yields, by pyrolysis, the semi-conductive oxide, may be nickel, manganese or lead.

Suitable solid electrolytic capacitors having an aluminum anode cannot, however, be obtained in this manner. If the above-mentioned process of wetting, drying and pyrolysing is applied only once to an aluminum anode body, the capacitor manufactured therefrom has a high value of the series resistance and an extremely high value of leakage current, so that the capacitor is not suitable for use. If, apart from this process, the anode body is subjected to subsequent formation, the value of the series resistance is even higher, whereas the leakage current is not improved. If the process of wetting, drying and pyrolysing is repeated, such a destruction of the formed oxide skin and a deterioration of the aluminum take place that the body obtained is completely unsuitable for the manufacture of a capacitor; a renewed formation will not even provide any improvement.

We have found that the above difficulties can be overcome and that it is possible to obtain solid electrolytic capacitors with aluminum anodes having exceptionally good values of series resistance for instance below 25 ohms, and leakage current for instance below 50μ a., by carrying out the drying of the anode body in certain way. More particularly, we have found that the drying of the anode body, which is wetted with the solution or the suspension of the salt, should be carried out under such temperatures and pressures that no pyrolysis of the salt occurs at the same time. For this purpose the wetted anode body is first dried at a low pressure, i.e., not more than about 10 mms. of Hg, preferably about 1 mm. or less at a temperature not too far above the boiling point of the solution or suspension at the pressure used, for instance between about 50 and 100° C. at a pressure of 0.5 mm. Hg or less.

With the manufacture of the conventional capacitors having a liquid electrolyte aluminum foil which may be etched is usually employed as a starting material, and which is provided by formation with a dielectric oxide skin and which is wound with the interposition of a support for the liquid or paste-like electrolyte together with a second, usually aluminum foil constituting the cathode of the capacitor. With the manufacture of a solid electrolytic capacitor according to the invention also a wound capacitor may be obtained by starting from an etched or non-etched aluminum foil, which is wound together with a second metal foil.

According to a further development of the invention the aluminum foils and the second metal foils are wound together with a separator material in between them, after which the aluminum is subjected to formation (if this had not been carried out prior to winding), the roll being then impregnated with the solution or the suspension of the salt to be converted into the semi-conductive oxide and then dried and heated in the manner described above for converting the salt, after which the formation of the foil, the impregnation, the drying and heating of the roll are repeated at least once and the body is subjected to subsequent formation. The separator material serves in this case, prior to the pyrolysis, as a support for the solution or the suspension of the salt to be converted and then as a support of the semi-conductive oxide obtained by the pyrolysis. In view of the temperature required for pyrolysis a refractory separator material is desirable. In accordance with a further development of the invention use is preferably made of a glass tissue.

In a further variation of the method according to the invention, use is made of a formed anode body wetted with a solution or a suspension of the salt to be converted by pyrolysis which body is obtained by compressing and sintering aluminum powder around a core, preferably also of aluminum. Such a compressed and sintered anode has a porous surface, which is effectively about a hundred times larger than the surface of a solid anode of the same dimensions, for example of a non-etched foil. Such an anode body is particularly suitable for impregnation with a solution or a suspension of the salt referred to above. A separate support is not required in this case. Finally a further aspect of the invention consists in that the formed anode body to be wetted with a solution or a suspension of the salt to be converted by pyrolysis consists of a support with an aluminum layer applied thereto by the Schoop's process. A support suitable in the scope of the invention is formed by an aluminum pin or wire. Use is preferably made of an anode body obtained by spraying aluminum on the support, while the support and the sprayer perform several revolutions relative to each other about the axis of the support. The resultant aluminum layer is fairly thick (for example 0.5 mm.) and porous and has properties that may be compared with those of a compressed and sintered anode.

In order that the invention may be clearly understood, and readily carried in effect, we shall describe the same in more detail with reference to the accompanying drawing in which.

Figure 1:
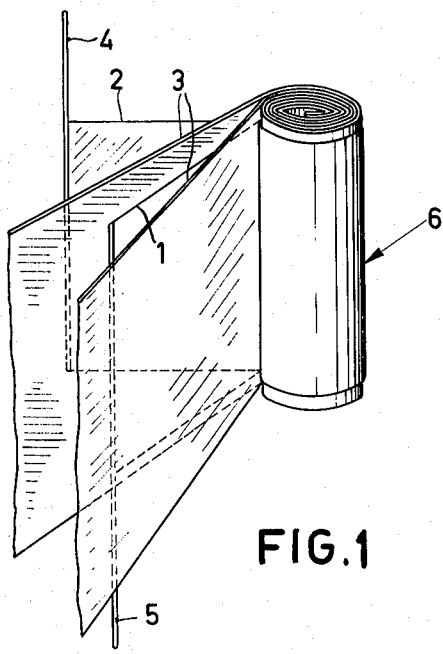
FIG. 1 is a partially unrolled foil capacitor according to the invention.

As shown in FIG. 1 formed strips of aluminum foil 1 of a size of 46 x 10 mms. and of a thickness of 80μ are welded to an aluminum current supply wire 5 and each wound with a non-formed foil 2 provided with a current supply wire 4 and intermediate strips of glass tissue 3 to obtain "rolls" 6. These rolls are impregnated in vacuo with a solution of manganese nitrate $(Mn(NO_3)_2 \cdot 4H_2O)$ in its water of crystallization. Then the impregnated rolls are dried under a pressure of 0.2 mm. Hg at a temperature initially of 50° C. and slowly raised to 100° C., care being taken that the liquid is not heated in excess of its boiling point. After the rolls have been completely dried, the water of crystallization being thus completely expelled, the rolls are heated at a temperature of 250° C. to 300° C. The capacitors thus obtained have a capacity of 23 μf., a series resistance of 100 ohms and a leakage current (at about 6 v.) of 50 μa. After this process is repeated once, a capacity value of 27 μf., a series resistance of 10 ohms and a leakage current of 200 μa. is measured. Then the roll is subjected to formation for 24 hours at a voltage of 6.4. v. The capacity of the roll then amounts to 25 μf., the series resistance is 10 ohms and the leakage current is 20 μa.

With the conventional aluminum capacitors containing liquid electrolyte, the average leakage current is also about 20 μa.

The rolled foil capacitor thus obtained is slipped into an aluminum tube and sealed with molten wax.

If a rolled foil capacitor is manufactured in identical manner except that the drying of the impregnated roll is carried out under atmospheric pressure the values of the capacity, the the series resistance and the leakage current are 15 μf., 260 ohms and 700 μa. respectively, if the impregnation, the drying process and the pyrolysis are carried out once. If the body is then subjected to formation for 24 hours, these values amount to 5 μf., 1000 ohms and 700 μa. respectively. If the process as a whole is then repeated, it is found that the roll is strongly attacked. A very high capacity value is measured, which is indicative of a destruction of the dielectric oxide skin.

Figure 2:
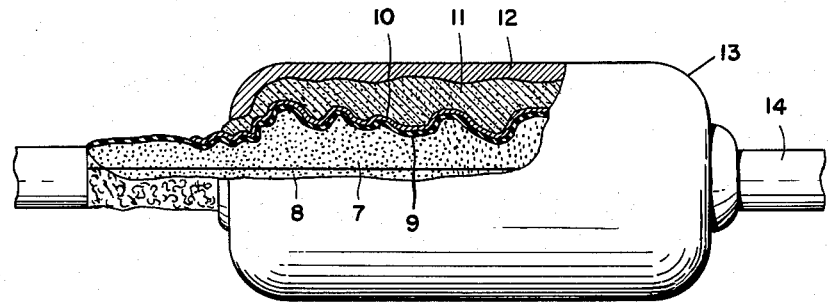
FIG. 2 is a partially-sectionized sideview of a capacitor, representing a further embodiment of the invention.

FIG. 2 represents a further embodiment of the invention, as described before and exhibiting similarly favourable properties to the rolled foil-capacitors.

In FIG. 2, 7 is a porous body of sintered Al obtained according to the Schoop's process around an aluminum pin or wire 8. This body was anodically oxidized to form a dielectric surface layer 9 and was provided with a semiconductive oxide layer 10, e.g., $MnO_2$ by means of impregnation and pyrolysis. The drying step subsequent to the impregnation was carried out in a pressure which did not exceed 10 mm. Hg. On the layer 10 a conductive layer 11 was applied (e.g. carbon) and a metal layer 12 applied on top, e.g. sprayed copper metal, forming an outer metal jacket 13 to which a connection lead 14 was then attached.

Figure 3:
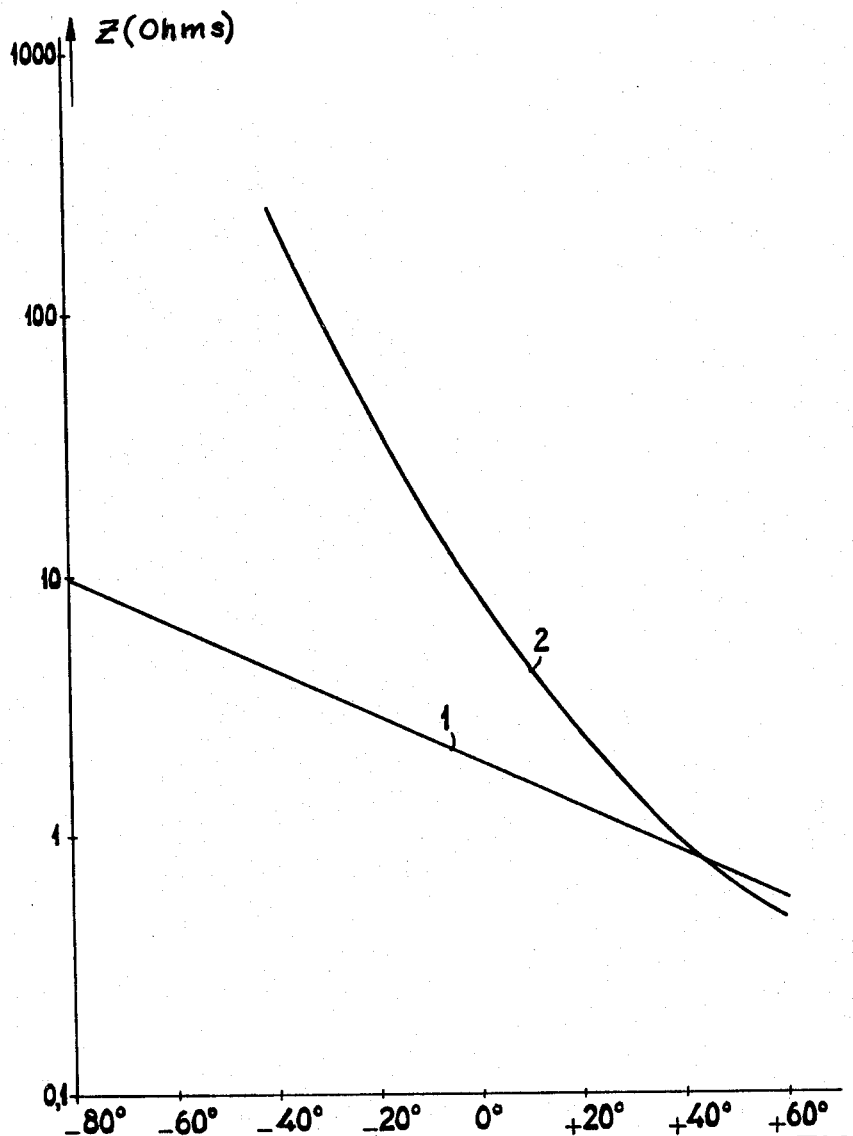
FIG. 3 is a graph showing the relationship between the impedance at 100 kc./s. and the temperature of a solid capacitor according to the invention and a capacitor with a liquid electrolyte made by a prior art method.

FIG. 3 illustrates in a graph the course of the impedance (Z) in ohms, measured with 100 kc./s., as a function of temperature (T) in degrees centigrade from −80° C. to +60° C. The curve 1 applies to the above-mentioned solid aluminum capacitor, the curve 2 to a conventional, liquid electrolytic capacitor with a foil of the same size and having a conventional electrolyte.

What is claimed is:

1. The method of forming a solid electrolytic capacitor comprising the steps, electroforming a dielectric layer on the surface of an aluminum anode body, wetting the resultant dielectric surface with a liquid containing an oxygen containing salt of a metal selected from the group consisting of nickel, manganese and lead, said salt being convertible by pyrolysis into an oxide higher than the monoxide of said metal, drying the resultant wetted body at a temperature below the pyrolysis temperature of said salt while maintaining a pressure not greater than 10 mm. Hg and then heating the resultant dried body at the pyrolysis temperature of the salt to thereby convert the salt to an oxide greater than the monoxide of said metal.

2. The method of claim 1 in which the steps are repeated at least once.

3. The method of claim 1 in which the first step is carried out at a temperature below that at which boiling of the liquid occurs at the prevailing pressure.

4. The method of claim 1 in which the metal is manganese.

5. The method of forming a solid electrolytic capacitor comprising the steps, electroforming a dielectric layer on the surface of an aluminum foil, winding into a roll the resultant aluminum anode foil with another metal foil together with a porous separating member, impregnating the roll with a liquid containing an oxygen containing salt of a metal selected from the group consisting of nickel, manganese and lead, said salt being convertible by pyrolysis into an oxide higher than the monoxide of said metal, drying the resultant wetted roll at a temperature below the pyrolysis temperature of said salt while maintaining a pressure not greater than 10 mm. Hg and then heating the dried roll at the pyrolysis temperature of the salt to thereby convert the salt to an oxide higher than the monoxide of said metal.

6. The method of claim 5 wherein the steps of impregnating, drying and heating to the pyrolysis temperature are repeated at least once.

7. The method of claim 5 wherein the metal is manganese.

References Cited by the Examiner
UNITED STATES PATENTS

| | | | |
|---|---|---|---|
| 2,005,279 | 6/1935 | Van Geel et al. | 317—230 |
| 2,872,629 | 2/1959 | Robinson | 317—230 |
| 2,936,514 | 5/1960 | Millard | 317—230 |
| 3,066,247 | 11/1962 | Robinson | 317—230 |
| 3,093,883 | 6/1963 | Haring et al. | 317—230 |

JOHN W. HUCKERT, *Primary Examiner.*

JAMES D. KALLAM, *Examiner.*

E. PUGH, *Assistant Examiner.*